(12) United States Patent
Ostendorf et al.

(10) Patent No.: US 9,617,186 B2
(45) Date of Patent: Apr. 11, 2017

(54) CURABLE ORGANOPOLYSILOXANE COMPOSITIONS

(71) Applicant: Wacker Chemie AG, Munich (DE)

(72) Inventors: Detlev Ostendorf, Dresden (DE); Uwe Scheim, Coswig (DE); Daniel Schildbach, Altoetting (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 14/915,004

(22) PCT Filed: Aug. 5, 2014

(86) PCT No.: PCT/EP2014/066835
§ 371 (c)(1),
(2) Date: Feb. 26, 2016

(87) PCT Pub. No.: WO2015/028267
PCT Pub. Date: Mar. 5, 2015

(65) Prior Publication Data
US 2016/0207832 A1 Jul. 21, 2016

(30) Foreign Application Priority Data
Aug. 28, 2013 (DE) .................. 10 2013 217 220

(51) Int. Cl.
| | | |
|---|---|---|
| *C04B 26/32* | (2006.01) | |
| *C08L 83/04* | (2006.01) | |
| *C08G 77/16* | (2006.01) | |
| *C08G 77/18* | (2006.01) | |

(52) U.S. Cl.
CPC .............. *C04B 26/32* (2013.01); *C08L 83/04* (2013.01); *C08G 77/16* (2013.01); *C08G 77/18* (2013.01)

(58) Field of Classification Search
None
See application file for complete search history.

(56) References Cited

U.S. PATENT DOCUMENTS

| | | | |
|---|---|---|---|
| 3,108,985 A | 10/1963 | Weyer | |
| 3,670,060 A | 6/1972 | Cuffaro et al. | |
| 4,643,921 A | 2/1987 | Terabe et al. | |
| 5,844,060 A * | 12/1998 | Furuya .................. | C08G 77/16 524/837 |
| 2004/0121139 A1* | 6/2004 | Yim ........................ | H01B 3/18 428/304.4 |
| 2008/0296795 A1 | 12/2008 | Willis-Papi | |
| 2009/0253829 A1 | 10/2009 | Toncelli | |
| 2011/0207849 A1 | 8/2011 | Cruz | |

FOREIGN PATENT DOCUMENTS

| | | |
|---|---|---|
| DE | 25 04 357 | 8/1975 |
| DE | 103 252 B1 | 3/1987 |
| DE | 693 00 933 T2 | 5/1996 |

* cited by examiner

*Primary Examiner* — Marc Zimmer
(74) *Attorney, Agent, or Firm* — Brooks Kushman P.C.

(57) ABSTRACT

An artificial stone can be prepared by binding a suitable stone filler with a binder which contains a silicon bonded, hydroxyl-functional silicone resin also optionally bearing silicon bonded alkoxy groups, and an organosilicon compound which is a silane or siloxane bearing silicon bonded alkoxy groups. The artificial stone is resistant to the effects of UV light as well as heat.

15 Claims, No Drawings

CURABLE ORGANOPOLYSILOXANE COMPOSITIONS

CROSS REFERENCE TO RELATED APPLICATIONS

This application is the U.S. National Phase of PCT Appln. No. PCT/EP2014/066835 filed Aug. 5, 2014, which claims priority to German Application No. 10 2013 217 220.6 filed Aug. 28, 2013, the disclosures of which are incorporated in their entirety by reference herein.

BACKGROUND OF THE INVENTION

1. Field of the Invention

The invention relates to curable organopolysiloxane compositions, to methods for the production thereof, and to the use thereof, in particular in the production of artificial stone.

2. Description of the Related Art

Artificial stone consisting of from 5 to 80% by weight organic polymer resins crosslinkable with suitable catalysts and from 20 to 95% by weight fillers, such as, for example, substances comprising silicon dioxide (quartz, quartzite, granite, porphyry, sand, silicates, clays, etc.), substances comprising calcium carbonate (marble, limestone, dolomite, etc.), substances comprising calcium or barium sulfate, aluminum oxide, aluminum trihydrate, magnesium oxide, magnesium hydroxide, zinc oxide and silicon carbide have been known for a long time. Reference is made in this connection, for example, to U.S. Pat. No. 4,643,921, including the literature cited therein, which is to form part of the disclosure of the present invention.

The polymer resin base used thereby, for example in Bretonstone® or Silestone® technology, is a radically crosslinkable polyester resin in combination with a reactive solvent such as styrene or methyl methacrylate or mixtures thereof. Reference is made in this connection, for example, to US-A 2008/0296795, including the literature cited therein, which is to form part of the disclosure of the present invention.

Furthermore, there are artificial stones which, instead of polyester resins, comprise methacrylate resins, as described in US-A 2011/0207849, wherein the specifications mentioned as prior art in that publication are likewise to form part of the disclosure of the present invention relative to the organic polymer resin binders based on polyester resin or methacrylate resins described therein.

There are further described as the resin base, for example in US-A 2009/0253829, epoxidized triglycerides from natural sources in the presence of cyclic, alkyl-substituted carboxylic anhydrides, Melamine resins, however, are also used as a polymer resin base in artificial stone, in U.S. Pat. No. 3,670,060.

A disadvantage of all the compositions known hitherto is that the binders have only limited resistance to UV radiation and weathering. This is outwardly visible because, in particular in the case of dark color shades, the colors of the artificial stone becomes significantly lighter and, in addition, they lose their sheen. In addition, the polymer matrix is not stable to heat, that is to say the polymers depolymerize with pronounced discoloration. Moreover, the cured organic polymer matrix, despite high filler contents, is flammable and sometimes burns with a very sooty flame.

Filled compositions based on organosiloxanes are likewise described in the literature. DD-A 103 252, for example, claims a method for producing molding compositions based on linear organopolysiloxanes. DE-A 2 504 357 describes silicone resin molding compositions, the crosslinkable resin base of which is composed of organopolysiloxane having at least 1.0% by weight Si-bonded OH groups and a linear diorganopolysiloxane having OH or triorganosilyl end groups. In U.S. Pat. No. 3,108,985, phenyl-alkylsiloxanes are claimed as the resin base. It is a disadvantage in all these cases, that despite high curing temperatures, only comparatively low hardnesses of the test specimens are achieved. In addition, harmful lead compounds are used as catalyst.

SUMMARY OF THE INVENTION

It has now been surprisingly and unexpectedly discovered that improved artificial stone can be prepared by binding a suitable stone filler with a binder which contains a silicon bonded, hydroxyl-functional silicone resin also optionally bearing silicon bonded alkoxy groups, and an organosilicon compound which is a silane or siloxane bearing silicon bonded alkoxy groups. The artificial stone is resistant to the effects of UV light as well as heat.

DETAILED DESCRIPTION OF THE PREFERRED EMBODIMENTS

The invention thus provides curable compositions comprising:

(A1) a resin component consisting of at least one organopolysiloxane resin consisting of units of the formula $$R_a(OH)_b(R^1O)_c SiO_{(4-a-b-c)/2} \quad (I),$$

wherein

R may be identical or different and denotes a monovalent, SiC-bonded hydrocarbon radical optionally substituted by a halogen atom, or an Si-bonded halogen atom, $R^1$ may be identical or different and denotes a monovalent, optionally substituted hydrocarbon radical, a is 0, 1, 2 or 3, b is 0, 1, 2 or 3 and c is 0, 1, 2 or 3, with the provisos that in formula (I) the sum $a+b+c \leq 3$, in the resin component (A1) $b \geq 1$ in at least 2% of all the units of formula (I), in the resin component (A1) $c \geq 1$ in not more than 10% of all the units of formula (I), in the resin component (A1) $a=2$ in at most 50% of the units of formula (I), and the resin component (A1) has a mean molecular weight Mw (weight average) of from 500 g/mol to 11,000 g/mol and a mean molecular weight Mn (number average) of from 500 g/mol to 5000 g/mol, and the polydispersity (Mw/Mn) of the resin component (A1) is from 1 to 5;

(A2) an organosilicon component consisting of at least one organosilicon compound consisting of units of the formula $$R^2_d(OH)_e(R^3O)_f SiO_{(4-d-e-f)/2} \quad (II),$$

wherein $R^2$ may be identical or different and denotes a monovalent, SiC-bonded hydrocarbon radical optionally substituted by a halogen atom, or an Si-bonded halogen atom, $R^3$ may be identical or different and denotes a monovalent, optionally substituted hydrocarbon radical, d is 0, 1 or 2, e is 0, 1, 2 or 3 and f is 0, 1, 2 or 3, with the provisos that in formula (II) the sum $d+e+f \leq 4$, in the organosilicon component (A2) $f \geq 1$ in at least 10% of all the units of formula (II), in the organosilicon component (A2) e≥1 in not more than 2% of all the units of formula (II), and in the organosilicon component (A2), in at most 50% of the units of formula (II) with d+e+f≤3, d=2 and (B) at least one filler.

In the present invention, weight average Mw and number average Mn are determined by gel permeation chromatography (GPC or size exclusion chromatography (SEC)) in accordance with DIN 55672-1 with polystyrene standard and refractive index detector (RI detector). Unless otherwise indicated, THF is used as the eluent for phenyl-containing components and toluene is used as the eluent for non-phenyl-containing components, and the analyses are performed at a column temperature of 45° C. The polydispersity is the quotient Mw/Mn.

The resin component (A1) used according to the invention has a weight average Mw of preferably from 500 to 9000 g/mol, more preferably from 1000 to 9000 g/mol, and in particular from 1500 to 7000 g/mol.

The resin component (A1) used according to the invention has a number average Mn of preferably from 500 to 3500 g/mol, more preferably from 1000 to 3500 g/mol, and in particular from 1000 to 2500 g/mol.

The resin component (A1) used according to the invention has polydispersity Mw/Mn of preferably from 1 to 4, more preferably from 1.2 to 3.6.

In preferably from 2 to 5% of all the units of formula (I) in the resin component (A1) used according to the invention, b≥1.

In the resin component (A1), c≥1 in preferably not more than 8%, more preferably not more than 6%, of all the units of formula (I).

In component (A1) used according to the invention, preferably not more than 30%, more preferably not more than 10%, and in particular not more than 4%, of the units of formula (I) are those wherein a=2.

The resin component (A1) used according to the invention can comprise only one type of siloxane consisting of units of formula (I) as well as mixtures of different types of siloxanes consisting of units of formula (I), wherein mixtures are preferred. The units of formula (I) are preferably distributed randomly in the siloxane molecules.

Examples of monovalent, SiC-bonded hydrocarbon radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals, such as the n-heptyl radical; octyl radicals such as the n-octyl radical and isooctyl radicals such as the 2,4,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl, 2-propenyl, n-5-hexenyl, 4-vinylcyclohexyl and 3-norbornenyl radicals; aryl radicals such as the phenyl, biphenylyl, naphthyl, anthryl and phenanthryl radicals; alkaryl radicals such as the o-, m-, and p-tolyl radicals, xylyl radicals and ethylphenyl radicals; and aralkyl radicals, such as the benzyl radical, and the α- and the β-phenylethyl radicals.

As a result of the preparation, a certain proportion of the radicals R can be a halogen atom, in particular a chlorine atom, but this is not preferred.

The radical R is preferably a monovalent, SiC-bonded hydrocarbon radical having from 1 to 18 carbon atoms, more preferably a methyl, ethyl, vinyl or phenyl radical.

Examples of radical $R^1$ are the radicals mentioned for R. The radical $R^1$ is a preferably monovalent hydrocarbon radical having from 1 to 18 carbon atoms, more preferably a methyl, ethyl, n-propyl, isopropyl, n-butyl, sec-butyl, tert-butyl or isobutyl radical, and in particular, the methyl or ethyl radical.

The radical $R^1$ is preferably monovalent hydrocarbon radicals having from 1 to 18 carbon atoms, particularly preferably the methyl, ethyl, n-propyl, isopropyl, n-butyl, sec-butyl, tert-butyl or isobutyl radical, in particular the methyl or ethyl radical.

The component (A1) used according to the invention is preferably a resin component (A1-1) consisting of at least one organopolysiloxane resin consisting of units of the formulae

$$RSiO_{3/2} \quad (III)$$

and

$$RSi(OH)O_{2/2} \quad (IV)$$

and optionally units selected from the group consisting of units of the formulae

$$RSi(OR^1)O_{2/2} \quad (V),$$

$$RSi(OR^1)_2O_{1/2} \quad (VI),$$

$$R_2SiO_{2/2} \quad (VII)$$

and

$$R_2Si(OH)O_{1/2} \quad (VIII),$$

wherein R and $R^1$ have one of the above-mentioned meanings and with the proviso that in the resin component (A1-1), the sum of the units of the formulae (IV) and (VIII), based on the total number of all the units of formulae (III) to (VIII), is at least 2%, in the resin component (A1-1), the sum of the units of formulae (V) and (VI), based on the total number of all the units of formulae (III) to (VIII), is not more than 10%, in the resin component (A1-1), the sum of the units of formulae (VII) and (VIII), based on the total number of all the units of formulae (III) to (VIII), is at most 50%, and the resin component (A1-1) has a mean molecular weight Mw of from 500 g/mol to 11,000 g/mol and a mean molecular weight Mn of from 500 g/mol to 5000 g/mol, and the polydispersity (Mw/Mn) of the resin component (A1-1) is from 1 to 5.

Examples of preferred resin components (A1-1) are

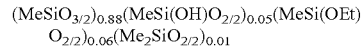

$(MeSiO_{3/2})_{0.88}(MeSi(OH)O_{2/2})_{0.05}(MeSi(OEt)O_{2/2})_{0.06}(Me_2SiO_{2/2})_{0.01}$ with Mw=6600 g/mol, Mn=2000 g/mol and Mw/Mn=3.3;

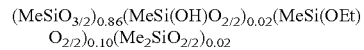

$(MeSiO_{3/2})_{0.86}(MeSi(OH)O_{2/2})_{0.02}(MeSi(OEt)O_{2/2})_{0.10}(Me_2SiO_{2/2})_{0.02}$ with Mw=10000 g/mol, Mn=2300 g/mol and Mw/Mn=4.3;

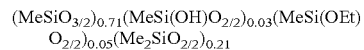

$(MeSiO_{3/2})_{0.71}(MeSi(OH)O_{2/2})_{0.03}(MeSi(OEt)O_{2/2})_{0.05}(Me_2SiO_{2/2})_{0.21}$ with Mw=4500 g/mol, Mn=1900 g/mol and Mw/Mn=2.4;

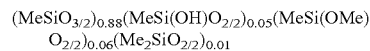

$(MeSiO_{3/2})_{0.88}(MeSi(OH)O_{2/2})_{0.05}(MeSi(OMe)O_{2/2})_{0.06}(Me_2SiO_{2/2})_{0.01}$ with Mw=9000 g/mol, Mn=2300 g/mol and Mw/Mn=3.9;

$(MeSiO_{3/2})_{0.33}(MeSi(OH)O_{2/2})_{0.05}(MeSi(OEt)O_{2/2})_{0.01}(Me_2SiO_{2/2})_{0.06}$ $(PhSiO_{3/2})_{0.24}(PhSi(OH)O_{2/2})_{0.28}(PhSi(OEt)O_{2/2})_{0.03}$ with Mw=3250 g/mol, Mn=1300 g/mol and Mw/Mn=2.5;

$(MeSiO_{3/2})_{0.34}(MeSi(OH)O_{2/2})_{0.03}(MeSi(OEt)O_{2/2})_{0.02}(PhSiO_{3/2})_{0.45}$ $(PhSi(OH)O_{2/2})_{0.13}(PhSi(OEt)O_{2/2})_{0.03}$ with Mw=4700 g/mol, Mn=1800 g/mol and Mw/Mn=2.6;

$(MeSiO_{3/2})_{0.27}(MeSi(OH)O_{2/2})_{0.03}(PhSiO_{3/2})_{0.34}(PhSi(OH)O_{2/2})_{0.14}$ $PhSi(OEt)O_{2/2})_{0.02}(PhMeSiO_{2/2})_{0.17}(PhMeSi(OH)O_{1/2})_{0.03}$ with Mw=2400 g/mol, Mn=1200 g/mol and Mw/Mn=2.0;

$(PhSiO_{3/2})_{0.45}(PhSi(OH)O_{2/2})_{0.44}PhSi(OEt)O_{2/2})_{0.09}(PhSi(OH)_2O_{1/2})_{0.02}$ with Mw=2900 g/mol, Mn=1500 g/mol and Mw/Mn=1.9;

$(PhSiO_{3/2})_{0.48}(PhSi(OH)O_{2/2})_{0.17}(PhSi(OEt)O_{2/2})_{0.02}$ $(CH_3(CH_2)_2SiO_{3/2})_{0.25}(CH_3(CH_2)_2Si(OH)O_{2/2})_{0.08}$ with Mw=1800 g/mol, Mn=1250 g/mol and Mw/Mn=1.4;

$(MeSiO_{3/2})_{0.32}(MeSi(OH)O_{2/2})_{0.06}(MeSi(OEt)O_{2/2})_{0.01}(Me_2SiO_{2/2})_{0.06}$ $(PhSiO_{3/2})_{0.23}(PhSi(OH)O_{2/2})_{0.29}(PhSi(OEt)O_{2/2})_{0.03}$ with Mw=1700 g/mol, Mn=1200 g/mol and Mw/Mn=1.4;

$(PhSiO_{3/2})_{0.50}(PhSi(OH)O_{2/2})_{0.15}(PhSi(OEt)O_{2/2})_{0.02}(CH_3(CH_2)_2SiO_{3/2})_{0.26}$ $(CH_3(CH_2)_2Si(OH)O_{2/2})_{0.07}$ with Mw=2800 g/mol, Mn=1200 g/mol and Mw/Mn=2.3;

$(MeSiO_{3/2})_{0.81}(MeSi(OH)O_{2/2})_{0.04}(MeSi(OEt)O_{2/2})_{0.05}(Me_2SiO_{2/2})_{0.10}$ with Mw=6500 g/mol, Mn=1900 g/mol and Mw/Mn=3.4;

and $(MeSiO_{3/2})_{0.88}(MeSi(OH)O_{2/2})_{0.05}(MeSi(OMe)O_{2/2})_{0.06}(Me_2SiO_{2/2})_{0.01}$ with Mw=6700 g/mol, Mn=2100 g/mol and Mw/Mn=3.2;

wherein Me denotes the methyl radical, Et denotes the ethyl radical and Ph denotes the phenyl radical.

Further preferably, the component (A1) used according to the invention is a resin component (A1-2) consisting of at least one organopolysiloxane resin consisting of units of the formulae $$SiO_{4/2} \quad (XVII),$$

$$R_3SiO_{1/2} \quad (XVIII)$$

and $$Si(OH)O_{3/2} \quad (XIX)$$

and optionally units selected from the group consisting of units of the formulae $$Si(OR^1)O_{3/2} \quad (XX),$$

$$Si(OR^1)_2O_{2/2} \quad (XXI),$$

$$Si(OR^1)_3O_{1/2} \quad (XXII),$$

$$Si(OH)_2O_{2/2} \quad (XXIII)$$

and $$Si(OH)_3O_{1/2} \quad (XXIV),$$

wherein R and $R^1$ have one of the above-mentioned meanings and with the proviso that in the resin component (A1-2), the sum of the units of formulae (XIX), (XXIII) and (XXIV), based on the total number of all the units of formulae (XVII) to (XXIV), is at least 2%, in the resin component (A1-2), the sum of the units of formulae (XX), (XXI) and (XXII), based on the total number of all the units of formulae (XVII) to (XXIV), is not more than 10%, the resin component (A1-2) has a mean molecular weight Mw of from 500 g/mol to 11,000 g/mol and a mean molecular weight Mn of from 500 g/mol to 5 000 g/mol, and the polydispersity (Mw/Mn) of the resin component (A1-2) is from 1 to 5.

Examples of preferred organopolysiloxane resins (A1-2) are $(SiO_{4/2})_{0.50}(Me_3SiO_{1/2})_{0.39}(Si(OEt)O_{3/2})_{0.06}(Si(OEt)_2O_{2/2})_{0.02}$ $(Si(OEt)_3O_{1/2})_{0.01}(Si(OH)O_{3/2})_{0.02}$ with Mw=7400 g/mol, Mn=3100 g/mol and Mw/Mn=2.4;

$(SiO_{4/2})_{0.45}(Me_3SiO_{1/2})_{0.43}(Si(OEt)O_{3/2})_{0.07}(Si(OEt)_2O_{2/2})_{0.02}$ $(Si(OEt)_3O_{1/2})_{0.01}(Si(OH)O_{3/2})_{0.02}$ with Mw=1400 g/mol, Mn=900 g/mol and Mw/Mn=1.6;

$(SiO_{4/2})_{0.45}(Me_3SiO_{1/2})_{0.36}(ViMe_2SiO_{1/2})_{0.06}(Si(OEt)O_{3/2})_{0.06}$ $(Si(OEt)_2O_{2/2})_{0.02}(Si(OEt)_3O_{1/2})_{0.01}(Si(OH)O_{3/2})_{0.04}$ with Mw=5300 g/mol, Mn=2600 g/mol and Mw/Mn=2.0; and $(SiO_{4/2})_{0.38}(Me_3SiO_{1/2})_{0.42}(ViMe_2SiO_{1/2})_{0.06}(Si(OEt)O_{3/2})_{0.07}$ $(Si(OEt)_2O_{2/2})_{0.02}(Si(OEt)_3O_{1/2})_{0.01}(Si(OH)O_{3/2})_{0.04}$ with Mw=2600 g/mol, Mn=1600 g/mol and Mw/Mn=1.6;

wherein Me denotes the methyl radical, Vi denotes the vinyl radical and Et denotes the ethyl radical.

The component (A1) used according to the invention is most preferably a resin component (A1-1).

The resin component (A1) can be either solid and liquid at 23° C. and 1013 hPa, wherein it is preferably solid.

The compounds of the resin component (A1) that are used according to the invention are already known and can be prepared by any desired methods known hitherto, such as, for example, by hydrolysis and condensation of mixtures of the corresponding chlorosilanes, alkoxysilanes or partially alkoxylated chlorosilanes.

Component (A1) is in particular a resin which can be prepared by reaction of the corresponding chlorosilanes, preferably methyltrichlorosilane, phenyltrichlorosilane, phenylmethyldichlorosilane, dimethyldichlorosilane, trimethylchlorosilane and/or tetrachlorosilane, dissolved in toluene, with a stoichiometric deficit of alcohol, based on the number of Si—Cl bonds, wherein HCl escapes at least in part, and then reaction with a stoichiometric excess of water, based on the sum of the Si—Cl and Si-alkoxy bonds, and subsequent separation of the aqueous and organic phase and separation of the toluene and alcohol from the organic phase.

The organosilicon component (A2) used according to the invention can comprise one type of organosilicon compound consisting of units of formula (II) as well as mixtures of different types of organosilicon compounds consisting of units of formula (II). If component (A2) comprises siloxanes, the units of formula (II) are preferably distributed randomly in the siloxane molecules.

The organosilicon component (A2) used according to the invention can be both silanes (A2-1), that is to say compounds of formula (II) wherein d+e+f=4, and siloxanes (A2-2), that is to say compounds comprising units of the formula (II) wherein d+e+f≤3.

The organosilicon component (A2-2) used according to the invention has a weight average Mw of preferably from 500 to 5000 g/mol, more preferably from 500 to 4000 g/mol, yet more preferably from 700 to 4000 g/mol, and in particular from 700 to 3000 g/mol.

The organosilicon component (A2-2) used according to the invention has a number average Mn of preferably from 200 to 3000 g/mol, more preferably from 200 to 2000 g/mol, yet more preferably from 200 to 1500 g/mol, and in particular from 500 to 1500 g/mol.

The organosilicon component (A2-2) used according to the invention has polydispersities of preferably from 1 to 5, more preferably from 1 to 4, and most preferably from 1.2 to 3.6.

In the organosilicon component (A2), f is ≥1 preferably in at least 25%, more preferably in at least 40%, and in particular in at least 50%, of all the units of formula (II).

In the organosilicon component (A2), e is ≥1 preferably in not more than 1%, more preferably in not more than 0.5%, and in particular in not more than 0.1%, of all the units of formula (II).

In the organosilicon component (A2), in preferably at most 10%, more preferably in at most 3% of the units of formula (II) with d+e+f≤3, d=2.

Examples of monovalent, optionally substituted, SiC-bonded hydrocarbon radicals $R^2$ are the radicals mentioned for R as well as the n-nonacosyl and the n-triacontyl radical.

As a result of the preparation, a certain proportion of the radicals $R^2$ can also be a halogen atom, in particular a chlorine atom, but this is not preferred.

The radical $R^2$ is preferably a monovalent, SiC-bonded hydrocarbon radical having from 1 to 18 carbon atoms, more preferably a methyl, ethyl, 2,4,4-trimethylpentyl, n-octyl or phenyl radical.

In the organosilicon component (A2-1), $R^2$ most preferably has the meaning of 2,4,4-trimethylpentyl, n-octyl or phenyl radical.

In the organosilicon component (A2-2), $R^2$ most preferably has the meaning of a methyl, ethyl, 2,4,4-trimethylpentyl or phenyl radical.

Examples of the radical $R^3$ are the radicals mentioned for $R^1$.

The radical $R^3$ is preferably a monovalent hydrocarbon radical having from 1 to 18 carbon atoms, more preferably a methyl, ethyl, n-propyl, isopropyl, n-butyl, sec-butyl, tert-butyl or isobutyl radical, and in particular a methyl or ethyl radical.

The siloxanes (A2-2) used according to the invention are preferably those consisting of units of the formulae $$R^2Si(OR^3)O_{2/2} \tag{XII}$$

and $$R^2Si(OR^3)_2O_{1/2} \tag{XIII}$$

and optionally units selected from the group consisting of units of the formulae $$R^2SiO_{3/2} \tag{X},$$

$$R^2Si(OH)O_{2/2} \tag{XI},$$

$$R^2_2SiO_{2/2} \tag{XIV},$$

$$R^2_2Si(OH)O_{1/2} \tag{XV}$$

and $$R^2_2Si(OR^3)O_{1/2} \tag{XVI},$$

wherein $R^2$ and $R^3$ have one of the above-mentioned meanings and with the provisos that in the organosilicon component (A2-2), the sum of the units of formulae (XII), (XIII) and (XVI), based on the total number of all the units of formula (X) to (XVI), is at least 10%, preferably at least 25%, more preferably at least 40%, and in particular at least 50%, in the organosilicon component (A2-2), the sum of the units of formulae (XI) and (XV), based on the total number of all the units of formulae (X) to (XVI), is not more than 2%, preferably not more than 1%, more preferably not more than 0.5%, and in particular not more than 0.1%, and in the organosilicon component (A2-2), the sum of the units of formulae (XIV), (XV) and (XVI) in the total number of all the units of formulae (X) to (XVI) is at most 50%, preferably at most 35%, more preferably at most 10%, and in particular at most 4%.

Examples of the siloxanes (A2-2) used according to the invention are $(MeSiO_{3/2})_{0.37}(MeSi(OEt)O_{2/2})_{0.46}(MeSi(OEt)_2O_{1/2})_{0.17}$ with Mw=2400 g/mol, Mn=900 g/mol and Mw/Mn=2.7;

$(MeSiO_{3/2})_{0.37}(MeSi(OH)O_{2/2})_{0.01}(MeSi(OEt)O_{2/2})_{0.46}(MeSi(OEt)_2O_{1/2})_{0.15}$ $(Me_2SiO_{2/2})_{0.01}$ with Mw=2800 g/mol, Mn=1000 g/mol and Mw/Mn=2.8;

$(MeSiO_{3/2})_{0.29}(MeSi(OH)O_{2/2})_{0.01}(MeSi(OMe)O_{2/2})_{0.47}(MeSi(OMe)_2O_{1/2})_{0.23}$ with Mw=2300 g/mol, Mn=600 g/mol and Mw/Mn=3.8;

$(MeSiO_{3/2})_{0.32}(MeSi(OMe)O_{2/2})_{0.48}(MeSi(OMe)_2O_{1/2})_{0.20}$ with Mw=3300 g/mol, Mn=900 g/mol and Mw/Mn=3.7;

$(PhSiO_{3/2})_{0.23}(PhSi(OMe)O_{2/2})_{0.51}(PhSi(OMe)_2O_{1/2})_{0.26}$ with Mw=1000 g/mol, Mn=700 g/mol and Mw/Mn=1.4;

$(MeSiO_{3/2})_{0.10}(MeSi(OMe)O_{2/2})_{0.17}(MeSi(OMe)_2O_{1/2})_{0.03}(PhSiO_{3/2})_{0.15}$ $(PhSi(OMe)O_{2/2})_{0.31}(PhSi(OMe)_2O_{1/2})_{0.20}(Me_2SiO_{2/2})_{0.04}$ with Mw=1800 g/mol, Mn=900 g/mol and Mw/Mn=2.0;

$(MeSiO_{3/2})_{0.10}(MeSi(OMe)O_{2/2})_{0.15}(MeSi(OMe)_2O_{1/2})_{0.03}$ $(MeSi(O(CH_2)_3CH_3)O_{2/2})_{0.03}(PhSiO_{3/2})_{0.15}(PhSi(OMe)O_{2/2})_{0.24}$ $(PhSi(OMe)_2O_{1/2})_{0.15}(PhSi(O(CH_2)_3CH_3)O_{2/2})_{0.06}$ $(PhSi(OMe)(O(CH_2)_3CH_3)O_{1/2})_{0.04}(PhSi(O(CH_2)_3CH_3)_2O_{1/2})_{0.01}(Me_2SiO_{2/2})_{0.04}$ with Mw=1400 g/mol, Mn=800 g/mol and Mw/Mn=1.8;

$(MeSiO_{3/2})_{0.31}(MeSi(OEt)O_{2/2})_{0.34}(MeSi(OEt)_2O_{1/2})_{0.10}(Me_2SiO_{2/2})_{0.22}$ $(Me_2Si(OEt)O_{1/2})_{0.01}(Me_2Si(OH)O_{1/2})_{0.02}$ with Mw=4500 g/mol, Mn=1900 g/mol and Mw/Mn=2.4;

$(i\text{-}OctSi(OMe)(OH)O_{1/2})_{0.01}(i\text{-}OctSi(OMe)O_{2/2})_{0.10}(i\text{-}OctSi(OMe)_2O_{1/2})_{0.16}(MeSiO_{3/2})_{0.26}(MeSi(OMe)O_{2/2})_{0.36}(MeSi(OMe)_2O_{1/2})_{0.11}$ with Mw=3000 g/mol, Mn=1500 g/mol and Mw/Mn=2.0;

$(Si(OEt)_2O_{2/2})_{0.42}(Si(OEt)O_{3/2})_{0.19}(Si(OEt)_3O_{1/2})_{0.39}$ with Mw=1000 g/mol, Mn=800 g/mol and Mw/Mn=1.2;

$(Si(OEt)_2O_{2/2})_{0.48}(Si(OEt)O_{3/2})_{0.35}(Si(OEt)_3O_{1/2})_{0.09}(SiO_{4/2})_{0.08}$ with Mw=1400 g/mol, Mn=900 g/mol and Mw/Mn=1.6;

$(i\text{-}OctSi(OMe)O_{2/2})_{0.09}(i\text{-}OctSiO_{3/2})_{0.06}(i\text{-}OctSi(OMe)_2O_{1/2})_{0.08}$ $(MeSiO_{3/2})_{0.23}(MeSi(OMe)O_{2/2})_{0.35}(MeSi(OMe)_2O_{1/2})_{0.19}$ with Mw=1400 g/mol, Mn=600 g/mol and Mw/Mn=2.3;

and $(i\text{-}OctSi(OMe)O_{2/2})_{0.11}(i\text{-}OctSiO_{3/2})_{0.05}(i\text{-}OctSi(OMe)_2O_{1/2})_{0.08}$ $(MeSiO_{3/2})_{0.22}(MeSi(OMe)O_{2/2})_{0.33}(MeSi(OMe)_2O_{1/2})_{0.20}$ $(i\text{-}OctSi(OH)O_{2/2})_{0.01}$ with Mw=1500 g/mol, Mn=700 g/mol and Mw/Mn=2.1;
wherein Me denotes the methyl radical, Et denotes the ethyl radical, i-Oct denotes the 2,4,4-trimethylpentyl radical and Ph denotes the phenyl radical.

In a further preferred embodiment, the component (A2) used according to the invention can be a silane of formula (II) (A2-1), in particular those wherein d is 1, e is 0 and f is 3.

Examples of silanes (A2-1) are n-octyltrimethoxysilane, n-octyltriethoxysilane, (2,4,4-trimethylpentyl)trimethoxysilane, (2,4,4-trimethylpentyl)triethoxysilane, n-hexadecyltrimethoxysilane, n-hexadecyltriethoxysilane, n-nonacosyltriethoxysilane, n-nonacosyltrimethoxysilane, n-triacontyltrimethoxysilane, n-triacontyltriethoxysilane, cyclohexyltrimethoxysilane, cyclohexyltriethoxysilane, n-hexadecylmethyldimethoxysilane, n-hexadecylmethyldiethoxysilane, (2,4,4-trimethylpentyl)methyldimethoxysilane, (2,4,4-trimethylpentyl)methyldiethoxysilane, n-octylmethyldimethoxysilane, n-octylmethyldiethoxysilane, (cyclohexyl)methyldimethoxysilane or (cyclohexyl)methyldiethoxysilane.

The silicon compounds (A2) used according to the invention can be either solid and liquid at 23° C. and 1013 hPa, wherein the organosilicon component (A2) is preferably liquid.

The viscosity of the organosilicon component (A2) at 25° C. is preferably less than 600 mPa·s, more preferably in the case of (A2-1) from 1 to 50 mPa·s, and preferably in the case of (A2-2) from 5 to 500 mPa·s.

Within the context of the present invention, the dynamic viscosity is determined in accordance with DIN 53019.

The boiling point of the organosilicon component (A2-1) used according to the invention is preferably in the range of from 100 to 370° C., more preferably from 100 to 250° C., in each case at a pressure of 1013 hPa.

The silicon compounds (A2) used according to the invention are already known and can be prepared by any desired processes hitherto known. Such processes include a selection and suitable combination of the reactions hydrolysis, alcoholysis, condensation and equilibration, such as, for example, alcoholysis of chlorosilanes optionally with subsequent hydrolysis and subsequent condensation. The desired silicone structural units in the form of the chlorosilanes as educts are preferably used as starting materials for the synthesis. Methanol or ethanol is preferably used in the alcoholysis.

The silanes (A2-1) are preferably silicon compounds which can be prepared by alcoholysis of organyltrichlorosilane, diorganyldichlorosilane or tetrachlorosilane.

The siloxanes (A2-2) are preferably silicon compounds which can be prepared by reaction of organyltrichlorosilane, optionally in admixture with diorganyldichlorosilane, and/or of tetrachlorosilane with the corresponding alcohol (alcoholysis) in stoichiometric excess and water (hydrolysis, condensation) in stoichiometric deficit, based on Si—Cl bonds originally present.

The siloxanes (A2-2) are particularly preferably silicon compounds which can be prepared by alcoholysis, hydrolysis and condensation of methyl-, ethyl-, vinyl-, n-octyl-, 2,4,4-trimethylpentyl-, cyclohexyl- or phenyl-trichlorosilane optionally with dimethyl-, diethyl-, ethylmethyl-, divinyl-, methylvinyl-, ethylvinyl-, phenylvinyl-, di-(n-octyl)-, methyl-(n-octyl)-, ethyl-(n-octyl)-, phenyl-(n-octyl)-, vinyl-(n-octyl)-, bis(2,4,4-trimethylpentyl)-, methyl-(2,4,4-trimethylpentyl)-, ethyl-(2,4,4-trimethylpentyl)-, phenyl-(2,4,4-trimethylpentyl)-, vinyl-(2,4,4-trimethylpentyl)-, di-(cyclohexyl)-, methyl-(cyclohexyl)-, ethyl-(cyclohexyl)-, phenyl-(cyclohexyl)-, vinyl-(cyclohexyl)-, diphenyl-dichlorosilane, and/or of tetrachlorosilane.

(A2-2) are in particular silicon compounds which can be prepared by alcoholysis, hydrolysis and condensation of methyl-, ethyl- or phenyl-trichlorosilane and/or -dichlorosilane and/or tetrachlorosilane.

In the compositions according to the invention, component (A1) is used relative to component (A2) in a ratio by weight of preferably from 99:1 to 50:50, more preferably from 95:5 to 60:40, and in particular from 90:10 to 70:30.

A premix consisting of components (A1) and (A2) preferably has a dynamic viscosity at 80° C. of from 1 to 3000 mPa·s, more preferably from 10 to 1000 mPa·s.

The compositions according to the invention preferably comprise components (A1) and (A2) in a total amount of from 1 to 30 parts by weight, more preferably from 2 to 15 parts by weight, and in particular from 5 to 10 parts by weight, in each case based on 100 parts by weight of the composition.

The fillers (B) used in the compositions according to the invention can be any desired fillers known hitherto.

Examples of fillers (B) are non-reinforcing fillers, that is to say fillers having a BET surface area of up to 50 m$^2$/g, such as quartz powder, quartz granules, molten quartz powder, quartz glass powder, glass powder, diatomaceous earth, calcium silicate, magnesium silicate, zirconium silicate, talcum, kaolin, zeolites, metal oxide powders, such as aluminum, titanium, iron or zinc oxides or mixed oxides thereof, barium sulfate, calcium carbonate, marble powder, gypsum, silicon nitride, silicon carbide, boron nitride, plastics powders, such as polyacrylonitrile powder; reinforcing fillers, that is to say fillers having a BET surface area of more than 50 m²/g, such as pyrogenic silica, precipitated silica, precipitated chalk, carbon black, such as furnace and acetylene black, and silicon-aluminum mixed oxides having a large BET surface area; aluminum trihydroxide, magnesium hydroxide, fillers in the form of hollow beads, such as ceramics microbeads, such as, for example, those which are obtainable under the trade name Zeeospheres™ from 3M Deutschland GmbH in D-Neuss; fibrous fillers, such as wollastonite, montmorillonite, bentonite as well as chopped and/or ground fibers of glass (short glass fibers), mineral wool or plastics material. The mentioned fillers can be rendered hydrophobic, for example by treatment with organo-silanes—or organosiloxanes or with stearic acid.

The fillers (B) that are used are preferably inorganic fillers, more preferably inorganic silicon-containing fillers, in particular those from natural sources, such as quartz, cristobalite, talcum, and fibrous silicon-containing fillers from natural sources, such as montmorillonite and wollastonite, or synthetic silicon-containing products such as pyrogenic silica, which can be obtained by flame hydrolysis of, for example, tetrachlorosilane in an oxyhydrogen flame (fumed silica), or amorphous quartz, which is obtainable by thermal after-treatment of pyrogenic silica (fused silica), or inorganic fibrous synthetic silicon-containing fillers, such as chopped or ground short glass fibers.

Filler (B) is most particularly preferably quartz, cristobalite, chopped or ground short glass fibers, montmorillonite, wollastonite or talc, which can optionally be surface-treated.

The fillers (B) can be used either each individually or in an arbitrary mixture with one another. There are preferably used as component (B) mixtures of finely divided and coarse-grained fillers.

The finely divided fillers (B) used according to the invention have particle sizes of preferably from 0.1 to 200 more preferably from 0.3 to 100 μm. In the case of fibrous fillers, this corresponds to the longest extent of the fibers.

The coarse-grained fillers (B) used according to the invention preferably have particle sizes of from 0.2 to 5 mm, more preferably from 0.2 to 3 mm. Quartz is most preferably used as the coarse-grained filler (B).

When mixtures of finely divided and coarse-grained fillers are used as component (B), the ratio by weight of finely divided to coarse-grained fillers is preferably from 5:1 to 1:5, more preferably from 3:1 to 1:3.

The particle size distribution of particles >500 μm is preferably analyzed in accordance with DIN ISO 3310-1 by means of an e200 LS air jet sieve from ALPINE using analysis sieves according to requirements. Analysis of the particle size distribution in the range of approximately from 0.02 to 500 μm is preferably carried out using a CILAS 1064 PARTICLE SIZE ANALYZER from Cilas.

The compositions according to the invention preferably comprise fillers (B) in amounts of, in total, from 70 to 99 parts by weight, more preferably from 75 to 95 parts by weight, and in particular from 85 to 95 parts by weight, in each case based on 100 parts by weight of the composition.

In addition to components (A1), (A2) and (B), the compositions according to the invention can comprise further substances which are different from components (A1), (A2) and (B), such as, for example, catalysts (C), further constituents (D), water (E) and additives (F).

Examples of catalysts (C) which are optionally used are any condensation catalysts known hitherto, for example metal compounds such as aluminum (III) neodecanoate, aluminum (III) stearate, aluminum (III) ethoxide, aluminum (III) octoate, aluminum (III) ethylhexanoate, aluminum (III) propoxide, aluminum (III) butoxide, aluminum (III) acetylacetonate, aluminum (III) (9-octadecenylacetoacetate) diisopropoxide, zinc (II) stearate, zinc (II) octoate, zinc (II) (2-ethylhexanoate), zinc (II) (acetylacetonate), zinc (II) bis-(2,2,6,6-tetramethyl-3,5-heptanedionate), strontium (II) (2-ethylhexanoate), titanium (IV) bis(ethylacetoacetato)-bis (iso-butanolato), titanium (IV) (n-butoxide), titanium (IV) (tert-butoxide), zirconium (IV) acetylacetonate, zirconium (IV) (2-ethylhexanoate), zirconium (IV) lactate, lithium (I) octanoate, bismuth (III) (2-ethylhexanoate), bismuth (III) neodecanoate, dioctyltin (IV) laurate, dibutyltin (IV) laurate, dimethyltin (IV) laurate, dioctyltin (IV) oxide, dibutyltin (IV) oxide, dimethyltin (IV) oxide, dioctyltin (IV) acetate, dibutyltin (IV) acetate, compound obtainable by reaction of dioctyltin (IV) acetate with tetraethoxysilane, compound obtainable by reaction of dibutyltin (IV) acetate with tetraethoxysilane, tin (II) octoate, lead (II) acetate, lead (II) octoate, lead (II) oxide, lead (II) sulfide, lead (II) carbonate, nickel (II) acetylacetonate, nickel (II) acetate, nickel (II) octoate, nickel (II) carbonate, cobalt (II) octoate, cobalt (II) carbonate, manganese (II) octoate, manganese (II) carbonate, and manganese (IV) oxide;

acids such as carboxylic acids, dicarboxylic acids, organophosphoric acid and its mono- and di-esters, phosphonic acids and their monoesters and diorganophosphinic acids, boric acid, boron (III) fluoride, ammonium salts and anhydrides of carboxylic acids;

bases such as alkali and alkaline earth hydroxides, alkali and alkaline earth alcoholates, butyllithium, and potassium siliconate;

silicon-free, nitrogen-containing compounds for example, primary amines such as 1-butylamine, sec-butylamine, tert-butylamine, 1-hexylamine, cyclohexylamine, 1-octylamine, 1,1,3,3-tetramethylbutylamine, 2-ethylhexylamine, 2-methyl-2-heptylamine; secondary amines such as diethylamine, di-n-butylamine, piperidine, piperazine, pyrrolidine; tertiary amines such as triethylamine, tri-n-butylamine, 1,4-diazabicyclo[2.2.2]octane (DABCO); amidines, such as acetamidine, 1,4,5,6-tetrahydropyrimidine, 1,5-diazabicyclo [4.3.0]non-5-ene (DBN), 1,8-diazabicyclo[5.4.0]undec-7-ene (DBU); iminoureas, such as guanidine, N-methylguanidine, N,N'-dimethylguanidine, N,N,N',N'-tetramethylguanidine, N,N,N',N'-tetramethyl-N"-(1,1-dimethylethyl)-guanidine, N-methyl-N'-nitroguanidine, 1,8-bis-(tetramethylguanidino)naphthalene (TMGN), guanylguanidine; and 1,5,7-triazabicyclo[4.4.0]dec-5-ene (TBD) and 7-methyl-1,5,7-triazabicyclo(4.4.0)dec-5-ene; aminosilanes such as N-cyclohexylaminomethylmethyl-diethoxysilane, N-cyclohexylaminomethylmethyl-dimethoxysilane, N-cyclohexylaminomethyl-triethoxysilane, N-cyclohexylaminomethyl-trimethoxysilane, N-phenylaminomethyl-triethoxysilane, N-phenylaminomethyl-trimethoxysilane, N-(2-aminoethyl)-3-aminopropyl-trimethoxysilane, N-(2-aminoethyl)-3-aminopropyl-triethoxysilane, N-(2-aminoethyl)-3-aminopropyl-methyltrimethoxysilane, N-(2-aminoethyl)-3-aminopropyl-methyltriethoxysilane, N-cyclohexyl-3-aminopropyl-triethoxysilane, N-cyclohexyl-3-aminopropyl-trimethoxysilane, N-cyclohexyl-3-aminopropyl-methyltriethoxysilane, N-cyclohexyl-3-aminopropyl-methyltrimethoxysilane, 3-aminopropyl-triethoxysilane, 3-aminopropyl-trimethoxysilane, 3-aminopropyl-methyltriethoxysilane and 3-aminopropyl-methyltrimethoxysilane.

The catalyst (C) that is optionally used is preferably bismuth (III) (2-ethylhexanoate), bismuth (III) neodecanoate, dioctyltin (IV) laurate, dibutyltin (IV) laurate, dimethyltin (IV) laurate, dioctyltin (IV) acetate, dibutyltin (IV) acetate, dimethyltin (IV) acetate, tin (II)octoate, zinc (II) acetylacetonate, zirconium (IV) (2-ethylhexanoate), aluminum (III) tert-butoxide, lithium hydroxide, sodium hydroxide, potassium hydroxide, calcium hydroxide, lithium methanolate, sodium methanolate, potassium methanolate, magnesium methanolate, calcium methanolate, lithium ethanolate, sodium ethanolate, potassium ethanolate, magnesium ethanolate, calcium ethanolate, potassium methylsiliconate, 1,8-diazabicyclo[5.4.0]undec-7-ene, 1,5,7-triazabicyclo[4.4.0]dec-5-ene, 7-methyl-1,5,7-triazabicyclo[4.4.0]dec-5-ene, N,N,N',N'-tetramethylguanidine, N-(2-aminoethyl)-3-aminopropyl-trimethoxysilane, N-(2-aminoethyl)-3-aminopropyl-triethoxysilane, 3-aminopropyl-triethoxysilane, 3-aminopropyl-trimethoxysilane, N-(2-aminoethyl)-3-aminopropyl-methyltrimethoxysilane, N-(2-aminoethyl)-3-aminopropyl-methyltriethoxysilane, 3-aminopropyl-methyltriethoxysilane, or 3-aminopropyl-methyltrimethoxysilane.

The catalyst (C) that is optionally used is in particular bismuth (III) (2-ethylhexanoate), bismuth (III) neodecanoate, tin (II) octoate, zinc (II) acetylacetonate, potassium methylsiliconate, 1,8-diazabicyclo[5.4.0]undec-7-ene, 1,5,7-triazabicyclo[4.4.0]dec-5-ene, 7-methyl-1,5,7-triazabicyclo[4.4.0]dec-5-ene or N,N,N',N'-tetramethylguanidine.

If the compositions according to the invention comprise catalyst(s) (C), the amounts in question are preferably from 0.0001 to 10 parts by weight, more preferably from 0.0001 to 5 parts by weight, and in particular from 0.0001 to 2 parts by weight, in each case based on a total of 100 parts by weight of components (A1) and (A2). The compositions according to the invention preferably comprise catalyst(s) (C).

The catalyst (C) that is optionally used is most particularly preferably 1,8-diazabicyclo[5.4.0]undec-7-ene, 1,5,7-triazabicyclo[4.4.0]dec-5-ene, 7-methyl-1,5,7-triazabicyclo[4.4.0]dec-5-ene, or N,N,N',N'-tetramethylguanidine, in amounts of from 0.0001 to 1 part by weight, based on a total of 100 parts by weight of components (A1) and (A2).

Examples of further constituents (D) that are optionally used are functional silanes, such as methacrylsilanes, glycidoxy-silanes and mercaptosilanes; silicates, such as sodium orthosilicate, disodium disilicate, disodium trisilicate, potassium silicate, calcium silicate and magnesium silicate.

If the compositions according to the invention comprise further constituents (D), the amounts in question are preferably from 1 to 15 parts by weight, more preferably from 1 to 10 parts by weight, in each case based on a total of 100 parts by weight of components (A1) and (A2). The compositions according to the invention preferably do not comprise component (D).

Examples of water (E) that is optionally used are any types of water, such as rainwater, demineralized water, water in the form of water of crystallization bound in salts, such as sodium sulfate decahydrate, aluminum sulfate octadecahydrate, calcium sulfate dihydrate, disodium metasilicate nonahydrate, disodium metasilicate pentahydrate; water adsorbed onto zeolites having pore sizes of from 0.3 to 1.5 nm, preferably from 0.3 to 1.0 nm; water bound to α-cyclodextrin with n=6 glucose molecules (void diameter/height: 0.47 to 0.53/0.79 nm), β-cyclodextrin with n=7 glucose molecules (void diameter/height: 0.60 to 0.65/0.79 nm) or γ-cyclodextrin with n=8 glucose molecules (void diameter/height: 0.75 to 0.83/0.79 nm).

If the compositions according to the invention comprise water (E) in unbound form or bound in the form of water of crystallization, the amounts in question are preferably from 0.1 to 5 parts by weight, more preferably from 0.1 to 2 parts by weight, and in particular from 0.1 to 1 part by weight, in each case calculated as pure water and based on a total of 100 parts by weight of components (A1) and (A2).

If the compositions according to the invention comprise water (E) in bound form in zeolites or cyclodextrins, the amounts in question are preferably from 1 to 10 parts by weight, more preferably from 1 to 5 parts by weight, in each case based on a total of 100 parts by weight of components (A1) and (A2). The compositions according to the invention preferably do not comprise component (E).

Examples of additives (F) that are optionally used according to the invention are pigments, preferably inorganic pigments such as iron oxides (yellow, black, red), chromium (III) oxide, and titanium dioxide, carbon black; dyes such as phthalocyanines, azo compounds; effect pigments for producing a metallic effect, such as platelets of gold, silver, copper, aluminum, silicon, mica, optionally coated with, for example, $FeTiO_3$, $Fe_2O_3$, $TiO_2$, or liquid crystal pigments for producing a goniochromatic color effect. The pigments can be used in powder form or in dispersion in a suitable liquid, particularly preferably in a liquid component (A2). The pigments can further be used applied to the coarse-grained fillers (B) as a surface coating.

If the compositions according to the invention comprise additives (F), the amounts in question are preferably from 1 to 20 parts by weight, more preferably from 1 to 15 parts by weight, and in particular from 1 to 10 parts by weight, in each case based on a total of 100 parts by weight of components (A1) and (A2). The compositions according to the invention preferably comprise component (F).

The compositions according to the invention are preferably those which comprise
(A1) resin component consisting of at least one organopolysiloxane resin consisting of units of formula (I),
(A2) organosilicon component consisting of at least one organosilicon compound consisting of units of formula (II),
(B) at least one filler,
(C) at least one catalyst,
optionally
(D) further constituents,
optionally
(E) water and
optionally
(F) additives.

The compositions according to the invention are more preferably those which comprise
(A1) resin component consisting of at least one organopolysiloxane resin (A1-1),
(A2) organosilicon component consisting of at least one organosilicon compound consisting of units of formula (II),
(B) at least one filler,
(C) at least one catalyst,
optionally
(D) further constituents,
optionally
(E) water and
optionally
(F) additives.

Apart from components (A1), (A2), (B) and optionally (C), (D), (E) and (F), the compositions according to the invention preferably do not comprise any further constituents.

The components used according to the invention can in each case be one type of such a component as well as a mixture of at least two types of a respective component.

The present invention further provides a method for producing the compositions according to the invention by mixing the individual components in any desired sequence.

In one embodiment of the method according to the invention, a premix is prepared from components (A1) and (A2), component (B) is metered in, and then components (C) to (F) that are optionally used are added.

In a further embodiment of the method according to the invention, component (B) is placed in a mixer, the premix of components (A1) and (A2) is metered in, and then components (C) to (F) that are optionally used are added.

In a further embodiment of the method according to the invention, component (B) is premixed with component (A2), and then component (A1) and subsequently also components (C) to (F) that are optionally used are added.

In a further embodiment of the method according to the invention, component (B) is premixed with component (A1), and then component (A2) and subsequently also components (C) to (F) that are optionally used are added.

Mixing can take place at room temperature and at the pressure of the surrounding atmosphere, that is to say approximately from 900 to 1100 hPa. If desired, however, mixing can also take place at higher temperatures, for example at temperatures in the range of from 30 to 150° C. It is further possible for mixing to be carried out temporarily or constantly under reduced pressure, such as, for example, at from 30 to 500 hPa absolute pressure, in order to remove volatile compounds and/or air.

In the method according to the invention, mixing of the components takes place in particular at a temperature that is at least 20 K below the boiling point of the organosilicon component (A2) that is used.

The method according to the invention can be carried out continuously, batchwise or semi-continuously.

In a preferred embodiment, the compositions according to the invention are kneadable mixtures of putty-like consistency which are very highly viscous at room temperature but can, however, be made to flow under correspondingly high mechanical pressure.

In a further preferred embodiment, the compositions according to the invention have the consistency of wet sand. They are conveyable, for example on conveyor belts, and are sufficiently stable for storage until further processing.

The compositions according to the invention can be brought into any desired form by mechanical pressure at ambient temperature or optionally at elevated temperature.

The compositions according to the invention crosslink at ambient temperature, usually room temperature, or at temperatures above room temperature by condensation reaction with cleavage of alcohol and optionally water.

Crosslinking can be accelerated by increasing the temperature, so that shaping and crosslinking can also be carried out in a common step.

The compositions according to the invention can be used for all purposes for which crosslinkable silicone compositions have hitherto also been used. Processing of the mixtures according to the invention is carried out by known methods.

The present invention further provides molded bodies produced by crosslinking the compositions according to the invention.

Molded bodies can be produced from the mixtures according to the invention by, for example, the method of injection molding, which has long been known per se. To that end, the mixture is injected by means of mechanical pressure into a corresponding mold cavity. The mold is generally in two parts and is closed during the injection molding operation by a hydraulic press. The mold is preheated to the desired temperature, whereby on the one hand flowing of the composition is facilitated and on the other hand curing is accelerated. At the end of the injection molding operation, the mold is kept closed until the molded bodies have reached a consistency that allows them to be removed without being damaged. Mold cavities for test specimens are described, for example, in DIN EN ISO 10724-1:2002-04.

The molded bodies according to the invention are preferably artificial stones.

The procedure for producing artificial stones is preferably as follows: the compositions according to the invention are first introduced into a mold and, in order to avoid gas inclusions, vacuum is then applied. Densification can take place in this step, preferably by setting the molding composition according to the invention in vibration via the molds. This is followed by a further densification of the composition by application of mechanical pressure. This compaction process, that is to say the densification optionally with vibration in vacuo, ideally lasts several minutes, preferably from 2 to 3 minutes. If the molded body is cured in the mold, the mold is heated at the same time as one of the preceding steps or subsequently for a period of preferably from 30 to 120 minutes at temperatures above room temperature, preferably at from 50 to 200° C., more preferably at from 80 to 160° C., and in particular at from 80 to 130° C. The molded body is then removed from the mold. Alternatively, as is particularly preferred, the still uncured molded body can be removed from the mold when molding is complete, that is to say after mechanical pressing, and cured at the above-mentioned temperatures and for the above-mentioned times in a subsequent separate step in a separate apparatus. The molded body is then advantageously stored further at ambient temperature for a period of at least one hour, preferably of at least 10 hours, more preferably from 24 to 48 hours. The molded body so obtained can then be processed further by known methods, such as, for example, by grinding, polishing of the surfaces and cutting.

The present invention further provides a method for producing artificial stone, wherein the compositions according to the invention are molded and allowed to crosslink.

The molded bodies according to the invention preferably have a hardness of preferably at least 50 Shore D, more preferably of at least 60 Shore D, and in particular of at least 75 Shore D.

The molded bodies according to the invention do not exhibit any color change (yellowing of light color shades or lightening of dark color shades) under the action of UV radiation as compared with conventional molded bodies based on organic resins, when significant changes are already visible in the case of the conventional systems.

The compositions according to the invention further have the advantage that they are outstandingly suitable for the production of artificial stone.

The compositions according to the invention have the advantage that no harmful emissions into the environment occur during processing, as is usually the case with polyester resins used according to the prior art, which are dissolved in styrene.

The molded bodies according to the invention have the advantage that they have excellent heat resistance so that, under a high thermal load of up to 200° C., lesser or no discolorations occur than is the case with molded bodies that are produced according to the current prior art using organic polyester or acrylate resins. Moreover, the mechanical properties are largely retained even after prolonged thermal load at very high temperatures (e.g. 1 hour at 700° C.)

The molded bodies according to the invention have the advantage that they are stable to UV and to weathering.

The molded bodies according to the invention have the advantage that they remain dimensionally stable under high thermal load and there is accordingly no risk of hot and/or burning solid and/or liquid material peeling off.

In the examples described below, all viscosity data, unless otherwise indicated, relate to a temperature of 25° C. Unless otherwise indicated, the following examples are carried out at a pressure of the ambient atmosphere, that is to say approximately at 1013 hPa, and at room temperature, that is to say at approximately 23° C., or at a temperature which is established when the reactants are combined at room temperature without additional heating or cooling, and at a relative humidity of approximately 50%. Furthermore, all data relating to parts and percentages, unless otherwise indicated, are based on weight.

In the present invention, substances are characterized by indicating data that are preferably obtained by means of instrumental analysis. The underlying measurements are either carried out following publicly available standards or are determined by specially developed methods. In order to ensure the clarity of the teaching that is imparted, the methods used are described here:

Viscosity

In the following examples, the dynamic viscosity of the organosilicon compounds is measured in accordance with DIN 53019. The procedure was preferably as follows: unless otherwise indicated, the viscosity is measured at 25° C. by means of a "Physica MCR 300" rotational rheometer from Anton Paar. For viscosities from 1 to 200 mPa·s, a coaxial cylinder measuring system (CC 27) with an annular measuring gap of 1.13 mm is used, and for viscosities greater than 200 mPa·s, a cone/plate measuring system (Searle-System with measuring cone CP 50-1) is used. The shear speed is matched to the polymer viscosity (1 to 99 mPa·s at 100 $s^{-1}$; 100 to 999 mPa·s at 200 $s^{-1}$; 1000 to 2999 mPa·s at 120 $s^{-1}$; 3000 to 4999 mPa·s at 80 $s^{-1}$; 5000 to 9999 mPa·s at 62 $s^{-1}$; 10000 to 12499 mPa·s at 50 $s^{-1}$; 12500 to 15999 mPa·s at 38.5 $s^{-1}$; 16000 to 19999 mPa·s at 33 $s^{-1}$; 20000 to 24999 mPa·s at 25 $s^{-1}$; 25000 to 29999 mPa·s at 20 $s^{-1}$; 30000 to 39999 mPa·s at 17 $s^{-1}$; 40000 to 59999 mPa·s at 10 $s^{-1}$; 60000 to 149999 at 5 $s^{-1}$; 150000 to 199999 mPa·s at 3.3 $s^{-1}$; 200000 to 299999 mPa·s at 2.5 $s^{-1}$; 300000 to 1000000 mPa·s at 1.5 $s^{-1}$.

After the measuring system has been adjusted to the measuring temperature, a three-stage measuring program consisting of a run-in phase, a pre-shear and a viscosity measurement is applied. The run-in phase is carried out by increasing the shear speed stepwise within one minute to the shear speed indicated above, which is dependent on the viscosity to be expected and at which the measurement is to be carried out. As soon as that shear speed is reached, pre-shear takes place at a constant shear rate for 30 seconds and then, for determining the viscosity, 25 individual measurements are carried out for in each case 4.8 seconds, from which the mean is determined. The mean corresponds to the dynamic viscosity, which is given in mPa·s.

Description of the Determination of the Molecular Weight Distributions

Method: Size exclusion chromatography (SEC) in accordance with DIN 55672-1

Flow rate: 1.00 ml/min

Injection system: Agilent 1200 autosampler (Agilent Technologies)

Injection volume: 100 µl

Eluent: In the case of products comprising phenyl groups, tetrahydrofuran >99.5%, stabilized with 250 ppm of 2,6-di-tert-butyl-4-methylphenol (BHT), was used; in the case of materials not comprising phenyl groups, toluene >99.9%, p.A., was used.

All the chemicals are obtainable commercially, for example from Merck KGaA, DE-Darmstadt.

Column: Stationary phase: polystyrene-divinylbenzene from Agilent Technologies

Four columns were connected in series, consisting of a pre-column having a length of 50 mm and three separating columns each having a length of 300 mm. All the columns had an inside diameter of 7.8 mm. The gels used had a particle size of 5 µm. The pore size of the pre-column was 500 Å, that of the three separating columns was, in order, 10,000 Å, 500 Å and 100 Å. Column temperature: Oven temperature 45° C. The concentration was determined with an RI detector (measuring principle deflection, type: Agilent 1200; cell volume: 8 µl; temperature: 45° C.

The system was calibrated with polystyrene standards likewise obtainable commercially from Agilent. Concentration: 0.4 g/l (EasiCal, ready-for-use polystyrene calibrating agent; injection volume: 100 µl. As internal standard for toluene as eluent, tetrahydrofuran was used as marker substance, and as internal standard for tetrahydrofuran as eluent, toluene was used as marker substance. Adaptation of calibration curves: third order polynomial fit PSS. Sample preparation: Approximately 15 to 50 mg of the sample to be measured were dissolved in the respective eluent (c=approximately 3-10 mg/ml). The amount of sample was such that a clear RI signal could be obtained. All the samples could be dissolved completely in the eluent.

Evaluation: The determined molar weights were in each case rounded to whole hundreds.

Flexural Strength

In the present invention, the flexural strength was measured in accordance with ISO 178:2011-04 Method A with a test speed of 2 mm/min at a support distance of 60 mm.

The procedure was preferably as follows: Test specimens of dimensions length×width×thickness=80 mm×10 mm×4 mm were used. The measurements were each carried out on 5 test specimens. The test specimens were produced by injection molding methods using a tool having exchangeable mold cavity plates according to DIN EN ISO 10724-1:2002-04 and cured under the conditions (temperature, time) indicated in the examples. In the test, the test specimens were always inserted into the machine in the same manner as they were positioned in the injection mold, that is to say with the bottom side downwards. Before the measurement, the test specimens were preliminarily stored at 23° C. and 50% relative humidity for the time indicated in the examples. The value given for the flexural strength in MPa corresponds to the mean of the individual measurements, rounded to whole numbers in accordance with DIN 1333:1992-02 Section 4.5.

Shore D Hardness

The measurement of the hardness was determined in accordance with DIN EN ISO 868:2003-10. The procedure was preferably as follows: The measurement was carried out using a durometer (Shore D hardness) on test specimens in sheet form of dimensions length×width×thickness=40 mm×40 mm×6 mm, which test specimens were produced by injection molding methods using a tool having exchangeable mold cavity plates in accordance with DIN EN ISO 10724-1:2002-04 Form 2 and cured under the conditions (temperature, time) indicated in the examples. Before the measurement, the test specimens were preliminarily stored at 23° C. and 50% relative humidity for the time indicated in the examples.

UV Resistance:

Testing of the UV resistance was carried out by means of a SUNTEST CPS+ from Atlas Material Testing Technology using the test specimens in sheet form mentioned above. An artificial light source (xenon lamp) having an optical filter system (coated quartz glass with UV special glass from Atlas Material Testing Technology) was used for simulating the visible and ultraviolet components of daylight, according to the provisions of CIE publication no. 85 (see DIN EN ISO 11431:2003-1). The spectral distribution of the radiation corresponded to the requirements indicated in ISO 4892-2 (Method A). In the wavelength range between 290 nm and 800 nm, the irradiation intensity at the surface of the test specimens was (550±75) W/m². The discoloration of the test specimens was determined on test specimens in sheet form of dimensions length×width×thickness=40 mm×40 mm×6 mm, which were produced by the above-described method. The test specimens were preliminarily stored at 23° C. and 50% relative humidity for the time indicated in the examples. The test specimens were then visually assessed after the storage cycles mentioned in the examples ("++"=no discoloration, "+"=slight discoloration, "○"=moderate discoloration, "−"=pronounced discoloration, "−−"=very pronounced discoloration).

Thermal Resistance

The thermal resistance in relation to discoloration was tested using flexural strength test specimens, which were produced by the method described above. The test specimens were stored preliminarily at 23° C. and 50% relative humidity for the time indicated in the examples. The test specimens were then stored in a commercial air-circulating drying cabinet for the time indicated in the examples at the indicated temperature. The discoloration of the test specimens was then assessed visually ("++"=no discoloration, "+"=slight discoloration, "○"=moderate discoloration, "−"=pronounced discoloration, "−−"=very pronounced discoloration).

The thermal resistance in relation to flexural strength was tested using flexural strength test specimens, which were produced by the method described above. The test specimens were stored preliminarily at 23° C. and 50% relative humidity for the time indicated in the examples. The test specimens were then stored in a commercial air-circulating drying cabinet for the time indicated in the examples at the indicated temperature. The flexural strength was then measured as indicated above on the test specimens cooled for 2 hours at 23° C. The indicated value for the flexural strength in MPa corresponds to the mean of the individual measurements, rounded to whole numbers in accordance with DIN 1333:1992-02 Section 4.5.

Resin Mixture 1:

100 parts by weight of a pulverulent organopolysiloxane resin (A1) having a mean molecular weight Mw of 6600 g/mol, a mean molecular weight Mn of 2000 g/mol and a polydispersity of 3.3, of the average formula

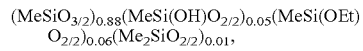

and 25 parts by weight of (2,4,4-trimethylpentyl)trimethoxysilane having a dynamic viscosity of 1.8 mPa·s were placed in a round-bottomed flask. The mixture was then heated to 55° C., with stirring, whereby a homogeneous mixture formed. The temperature of the mixture was then increased to 95° C. and, when that temperature had been reached, a pressure of 100 mbar was applied. Stirring was carried out for a further 2.5 hours under those conditions, following which the mixture was allowed to cool at a pressure of 100 mbar to a temperature of 23° C. before the vacuum was broken. The resin mixture so obtained had a dynamic viscosity of 35,000 mPa·s at 25° C. and a dynamic viscosity of 400 mPa·s at 80° C.

Resin Mixture 2:

100 parts by weight of a pulverulent organopolysiloxane resin (A1) having a mean molecular weight Mw of 6600 g/mol, a mean molecular weight Mn of 1900 g/mol and a polydispersity of 3.5, of the average formula

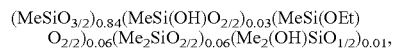

and 25.5 parts by weight of (2,4,4-trimethylpentyl)trimethoxysilane having a dynamic viscosity of of 1.8 mPa·s were placed in a round-bottomed flask, and then the mixture was heated to 55° C., with stirring, whereby a homogeneous mixture formed. The temperature of the mixture was then increased to 95° C. and, when that temperature had been reached, a pressure of 100 mbar was applied. Stirring was carried out for a further 2.5 hours under those conditions, following which the mixture was allowed to cool at a pressure of 100 mbar to a temperature of 23° C. before the vacuum was broken. The resin mixture so obtained had a dynamic viscosity of 9000 mPa·s at 25° C. and a dynamic viscosity of 300 mPa·s at 80° C.

Resin Mixture 3:

100 parts by weight of a pulverulent organopolysiloxane resin (A1) having a mean molecular weight Mw of 6600 g/mol, a mean molecular weight Mn of 2000 g/mol and a polydispersity of 3.3, of the average formula

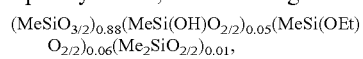

65 parts by weight of an organosilicon compound having the average composition $(MeSiO_{3/2})_{0.19}$ $(i\text{-}OCtSiO_{3/2})_{0.05}$ $(MeSi(OMe)\ O_{2/2})_{0.30}$ $(i\text{-}OCtSi\ (OMe)\ O_{2/2})_{0.08}$ $(MeSi(OMe)_2O_{1/2})_{0.16}$ $(i\text{-}OCtSi\ (OMe)_2O_{1/2})_{0.07}$ $(Me_2SiO_{2/2})_{0.15}$ having a mean molecular weight Mw of 1550 g/mol, a mean molecular weight Mn of 550 g/mol and a polydispersity of 2.8, were placed in a round-bottomed flask. The mixture was then heated to 55° C., with stirring, whereby a homogeneous mixture formed. The temperature of the mixture was then increased to 95° C. and, when that temperature had been reached, a pressure of 100 mbar was applied. Stirring was carried out for a further 2.5 hours under those conditions, following which the mixture was allowed to cool at a pressure of 100 mbar to a temperature of 23° C. before the vacuum was broken. The resin mixture so obtained had a dynamic viscosity of 6000 mPa·s at 25° C. and a dynamic viscosity of 200 mPa·s at 80° C.

Example B1

100 parts by weight of resin mixture 1 and 300 parts by weight of quartz powder 16900 (obtainable commercially from Amberger Kaolinwerke, D-Hirschau) were mixed for 30 seconds at 3000 rpm in a Speedmixer™ DAC 150 FVZ from Hauschild & Co. KG. The mixture was then allowed to stand until it had cooled to a temperature of 23° C. 0.16 part by weight of 1,1,3,3-tetramethylguanidine ("TMG"; CAS no. 80-70-6; obtainable commercially from Sigma-Aldrich®, D-Steinheim) was then added and the mixture was again stirred for 30 seconds at 2000 rpm. Test specimens were then produced from the mixture. To that end, an oil-hydraulic press of type VSKO 75 from Lauffer GmbH & Co. KG was used. The press was equipped with a tool having exchangeable mold cavity plates according to DIN EN ISO 10724-1:2002-04, with which it was possible to produce test specimens of dimensions length×width×thickness=80 mm×10 mm×4 mm (for testing the flexural strength and the thermal resistance) or length×width×thickness=40 mm×40 mm×6 mm (for testing the hardness and the UV resistance). The mold was closed hydraulically with a closing force of 140 kN. The mold had the external dimensions length×width=450 mm×450 mm. The press die had a diameter of 50 mm. To produce the test specimens, 100 g of the above-described mixture were introduced and injected with a press force of 5 kN into the respective mold cavity, which was preheated to a temperature of 120° C. When the mold cavities were completely full, the press force increased to 25 kN. At this point, the hydraulics were switched off. During curing, the force slowly decreased and was 14 kN at the end of the entire pressing and curing operation. After 30 minutes at 120° C., the tool was opened and the test specimens were removed.

The test specimens so obtained were tested in respect of their properties. The results are to be found in Tables 1 to 6.

Example B2

The procedure described in Example 1 was repeated, with the difference that quartz powder Millisil W12 (obtainable commercially from Quarzwerke GmbH, D-Frechen) was used instead of quartz powder 16900 and 1.35 parts by weight of dioctyltin dilaurate (obtainable commercially under the name TIB KAT 216 from TIB Chemicals, D-Mannheim) was used instead of 0.16 part by weight of 1,1,3,3-tetramethylguanidine.

The test specimens so obtained were tested in respect of their properties. The results are to be found in Tables 1 to 6.

Example B3

The procedure described in Example 1 was repeated, with the difference that 1.6 parts by weight of a 90% by weight solution of zirconium (IV) 2-ethylhexanoate in white spirit (CAS no. 2233-42-3; obtainable commercially from ABCR, D-Karlsruhe) were used instead of 0.16 part by weight of 1,1,3,3-tetramethylguanidine.

The test specimens so obtained were tested in respect of their properties. The results are to be found in Tables 1 to 6.

Example B4

The procedure described in Example 1 was repeated, with the difference that 0.75 part by weight of a 70% by weight solution of bismuth(III) neodecanoate in neodecanoic acid (CAS no. 34364-26-6; obtainable commercially from ABCR, D-Karlsruhe) was used instead of 0.16 part by weight of 1,1,3,3-tetramethylguanidine.

The test specimens so obtained were tested in respect of their properties. The results are to be found in Tables 1 to 6.

Example B5

The procedure described in Example 1 was repeated, with the difference that, in addition to 100 parts by weight of resin mixture 1 and 300 parts by weight of quartz powder 16900, 3 parts by weight of sodium silicate powder (CAS no. 1344-09-8; obtainable commercially under the name Sikalon A from Wöllner GmbH & Co. KG, D-Ludwigshafen) and 0.3 part by weight of commercial demineralized water were mixed in.

The test specimens so obtained were tested in respect of their properties. The results are to be found in Tables 1 to 6.

Example B6

The procedure described in Example 1 was repeated, with the difference that resin mixture 2 was used instead of resin mixture 1 and 180 parts by weight of quartz powder 16900 and 120 parts by weight of short glass fibers (obtainable commercially under the name Glass Fiber MF 7904 from Lanxess GmbH, D-Leverkusen) were mixed in instead of 300 parts by weight of quartz powder 16900.

The test specimens so obtained were tested in respect of their properties. The results are to be found in Tables 1 to 6.

Example B7

The procedure described in Example 1 was repeated, with the difference that resin mixture 3 was used instead of resin mixture 1 and 0.4 part by weight of 1,1,3,3-tetramethylguanidine was used instead of 0.16 part by weight of 1,1,3,3-tetramethylguanidine.

The test specimens so obtained were tested in respect of their properties. The results are to be found in Tables 1 to 6.

Comparative Example V1

100 parts by weight of a solution of an unsaturated polyester in styrene having a solids content of from 62 to 65% by weight (obtainable commercially under the name Palatal P4-01 from Büfa GmbH & Co. KG, D-Oldenburg) and 0.05 part by weight of a 65% by weight solution of cobalt (II) 2-ethylhexanoate in white spirit (CAS no. 136-52-7; obtainable commercially from ABCR, D-Karlsruhe) were mixed for 15 seconds at 3000 rpm in a Speedmixer™ DAC 150 FVZ. 1 part by weight of a 32% by weight 2-butanone peroxide solution (CAS no. 1338-23-4; obtainable commercially under the name Luperox® DHD-9 from Sigma-Aldrich®, D-Steinheim) was then added and mixing was again carried out for 15 seconds in the Speedmixer™ at 2000 rpm. The mixture was supplemented with 300 parts by weight of quartz powder 16900 and mixed for a further 30 seconds in the Speedmixer™ at 2000 rpm. The mold cavities were preheated to 50° C. After the mixture had been injected into the mold cavities, tempering was carried out for 30 minutes at 50° C. instead of for 30 minutes at 120° C. After 30 minutes, the temperature of the pressing tool was increased to 80° C. and, when that temperature had been reached, the molded bodies were tempered for a further 30 minutes. The tool was then opened and the test specimens were removed.

The test specimens so obtained were tested in respect of their properties. The results are to be found in Tables 1 to 6.

TABLE 1

Preliminary storage of the test specimens for 28 days at 23° C. and 50% relative humidity

| Example | B1 | B2 | B3 | B4 | B5 | B6 | B7 | V1 |
|---|---|---|---|---|---|---|---|---|
| Hardness (Shore D) | 80 | 72 | 70 | 79 | 84 | 83 | 86 | 88 |
| Flexural strength [MPa] | 35 | 33 | 14 | 32 | 46 | 54 | 35 | 71 |

TABLE 2

Preliminary storage of the test specimens for 28 days at 23° C. and 50% relative humidity followed by storage for 1 day at 200° C.

| Example | B1 | B2 | B3 | B4 | B5 | B6 | B7 | V1 |
|---|---|---|---|---|---|---|---|---|
| Hardness (Shore D) | | | | | | | 84 | 88 |
| Flexural strength [MPa] | | | | | | | 32 | 91 |
| Visual assessment | ++ | ++ | ++ | ++ | ++ | ++ | ++ | ○[1] |

[1] dark-yellow discoloration externally

TABLE 3

Preliminary storage of the test specimens for 28 days at 23° C. and 50% relative humidity followed by storage for 7 days at 200° C.

| Example | B1 | B2 | B3 | B4 | B5 | B6 | B7 | V1 |
|---|---|---|---|---|---|---|---|---|
| Hardness (Shore D) | | | | | | | 89 | 94 |
| Flexural strength [MPa] | | | | | | | 32 | 68 |
| Visual assessment | ++ | ++ | ++ | ++ | ++ | ++ | ++ | −[1] |

[1] ocher to brown discoloration externally, dark-brown discoloraton internally

TABLE 4

Preliminary storage of the test specimens for 28 days at 23° C. and 50% relative humidity followed by storage for 2 hours at 300° C.

| Example | B1 | B2 | B3 | B4 | B5 | B6 | B7 | V1 |
|---|---|---|---|---|---|---|---|---|
| Hardness (Shore D) | | | | | | | 84 | 72 |
| Flexural strength [MPa] | | | | | | | 23 | 7 |
| Visual assessment | ++ | ++ | ++ | ++ | ++ | ++ | ++ | −−[1] |

[1] pronounced dark-brown discoloration externally and internally

TABLE 5

Preliminary storage of the test specimens for 28 days at 23° C. and 50% relative humidity followed by storage for 1 hour at 700° C.

| | Example | |
|---|---|---|
| | B7 | V1 |
| Hardness (Shore D) | 87 | [1] |
| Flexural strength [MPa] | 15 | [1] |
| Visual assessment | +[2] | — |

[1] not measurable because test specimen disintegrated
[2] a light ash-like wipeable white deposit formed on the surface of the test specimen

TABLE 6

Preliminary storage of the test specimens for 28 days at 23° C. and 50% relative humidity followed by UV irradiation with a xenon light source

| Example | B1 | B2 | B3 | B4 | B5 | B6 | B7 | V1 |
|---|---|---|---|---|---|---|---|---|
| Visual assessment after 1000 h | ++ | ++ | ++ | ++ | ++ | ++ | ++ | + |
| Visual assessment after 2000 h | ++ | ++ | ++ | ++ | ++ | ++ | ++ | ○ |

The invention claimed is:

1. A curable resin composition, comprising:
(A1) a silicone resin component comprising at least one organopolysiloxane resin consisting of units of the formula $$R_a(OH)_b(R^1O)_c SiO_{(4-a-b-c)/2} \quad (I),$$

wherein
R each are identical or different, and denote a monovalent, SiC-bonded hydrocarbon radical optionally substituted by halogen, or denote a Si-bonded halogen atom,
$R^1$ each are identical or different and denote a monovalent, optionally substituted hydrocarbon radical,
a is 0, 1, 2 or 3,
b is 0, 1, 2 or 3 and
c is 0, 1, 2 or 3,
with the provisos that:
in formula (I) the sum a+b+c≤3,
in the resin component (A1) b≥1 in at least 2% of all the units of formula (I),
in the resin component (A1) c≥1 in not more than 10% of all the units of formula (I),
in the resin component (A1) a=2 in at most 50% of the units of formula (I), and
the resin component (A1) has a mean molecular weight Mw (weight average) of from 500 g/mol to 11,000 g/mol and a mean molecular weight Mn (number average) of from 500 g/mol to 5000 g/mol, and the polydispersity (Mw/Mn) of the resin component (A1) is from 1 to 5,
(A2) an organosilicon component consisting of at least one organosilicon compound consisting of units of the formula $$R^2_d(OH)_e(R^3O)_f SiO_{(4-d-e-f)/2} \quad (II),$$

wherein
$R^2$ each are identical or different and denote a monovalent, SiC-bonded hydrocarbon radical optionally substituted by halogen, or denote a Si-bonded halogen atom,
$R^3$ each are identical or different and denote a monovalent, optionally substituted hydrocarbon radical,
d is 0, 1 or 2,
e is 0, 1, 2 or 3 and
f is 0, 1, 2 or 3,
with the provisos that:
in formula (II) the sum d+e+f≤4,
in the organosilicon component (A2) f≥1 in at least 10% of all the units of formula (II),
in the organosilicon component (A2) e≥1 in not more than 2% of all the units of formula (II), and
in the organosilicon component (A2), in at most 50% of the units of formula (II) with d+e+f≤3, d=2, and
(B) at least one filler.

2. The composition of claim 1, wherein component (A1) is a resin component (A1-1) consisting of at least one organopolysiloxane resin consisting of units of the formulae $$RSiO_{3/2} \quad (III), \text{ and}$$

$$RSi(OH)O_{2/2} \quad (IV)$$

and optionally units selected from the group consisting of units of the formulae $$RSi(OR^1)O_{2/2} \quad (V),$$

$$RSi(OR^1)_2O_{1/2} \quad (VI),$$

$$R_2SiO_{2/2} \quad (VII), \text{ and}$$

$$R_2Si(OH)O_{1/2} \quad (VIII),$$

wherein R and $R^1$ have one of the above-mentioned meanings and with the provisos that:
in the resin component (A1-1), the sum of the units of formulae (IV) and (VIII), based on the total number of all the units of formulae (III) to (VIII), is at least 2%,
in the resin component (A1-1), the sum of the units of formulae (V) and (VI), based on the total number of all the units of formulae (III) to (VIII), is not more than 10%,
in the resin component (A1-1), the sum of the units of formulae (VII) and (VIII), based on the total number of all the units of formulae (III) to (VIII), is at most 50%, and
the resin component (A1-1) has a mean molecular weight Mw of from 500 g/mol to 11,000 g/mol and a mean molecular weight Mn of from 500 g/mol to 5000 g/mol, and the polydispersity (Mw/Mn) of the resin component (A1-1) is from 1 to 5.

3. The composition of claim 1, wherein component (A1) is present, relative to component (A2), in a weight ratio of from 99:1 to 50:50.

4. The composition of claim 2, wherein component (A1) is present, relative to component (A2), in a weight ratio of from 99:1 to 50:50.

5. The composition of claim 1, wherein components (A1) and (A2) are present in a total amount of from 1 to 30 parts by weight, based on 100 parts by weight of the composition.

6. The composition of claim 2, wherein components (A1) and (A2) are present in a total amount of from 1 to 30 parts by weight, based on 100 parts by weight of the composition.

7. The composition of claim 3, wherein components (A1) and (A2) are present in a total amount of from 1 to 30 parts by weight, based on 100 parts by weight of the composition.

8. The composition of claim 1, wherein filler(s) (B) are present in a total amount of from 70 to 99 parts by weight, based on 100 parts by weight of the composition.

9. The composition of claim 2, wherein filler(s) (B) are present in a total amount of from 70 to 99 parts by weight, based on 100 parts by weight of the composition.

10. A method for producing a compositions of claim 1, comprising mixing the individual components in any desired sequence.

11. The method of claim 10, wherein the mixing takes place at a temperature that is at least 20 K below the boiling point of the organosilicon component (A2).

12. A molded body produced by crosslinking a composition of claim 1.

13. A molded body produced by crosslinking a composition of claim 2.

14. The molded body of claim 12, which is an artificial stone.

15. A method for producing an artificial stone product, comprising molding and crosslinking a composition of claim 1.

* * * * *